United States Patent [19]

Beneventano et al.

[11] Patent Number: 4,945,647
[45] Date of Patent: Aug. 7, 1990

[54] NORTH FINDING SYSTEM

[75] Inventors: Thomas Beneventano, Washington Township, County of Bergen; Raymond M. Bendett, Ridgewood, both of N.J.

[73] Assignee: Allied-Signal Inc., Morris Township, Morris County, N.J.

[21] Appl. No.: 327,874

[22] Filed: Mar. 23, 1989

[51] Int. Cl.⁵ .............................................. G01C 19/38
[52] U.S. Cl. .......................................... 33/321; 33/318
[58] Field of Search ................. 33/316, 320, 321, 322, 33/323, 324, 326

[56] References Cited

U.S. PATENT DOCUMENTS

| | | | |
|---|---|---|---|
| 3,987,555 | 10/1976 | Haagens et al. | 33/324 |
| 4,283,960 | 8/1981 | Querrman | 33/326 |
| 4,379,365 | 4/1983 | Riethmüller et al. | 33/326 |
| 4,443,952 | 4/1984 | Schulien et al. | 33/324 |
| 4,458,426 | 7/1984 | O'Conner et al. | 33/325 |
| 4,461,089 | 7/1984 | Krogmann | 33/324 |
| 4,686,771 | 8/1987 | Beneventano et al. | 33/324 |

Primary Examiner—William A. Cuchlinski, Jr.
Assistant Examiner—William C. Dowling
Attorney, Agent, or Firm—Howard G. Massung; Robert A. Walsh

[57] ABSTRACT

A gyrocompassing system intended for land based equipment requiring north reference information includes a novel gyrocompass implementation which enables utilization of high grade inertial sensors while achieving the desired goal of moderate cost. The north finding system is designed to provide high accuracy with fast reaction time over a wide temperature range without the aid of heaters and other auxilliary equipment. The arrangement is specifically configured to tolerate settling and/or oscillatory base motion without additional reaction time or degradation of gyrocompassing accuracy.

14 Claims, 7 Drawing Sheets

POSITION FOR FIRST READING
GYRO MEASUREMENT
R1 = ωH = −ωH Sin ψ

FIG. 3B

POSITION FOR SECOND READING
GYRO MEASUREMENT
R2 = ωH COS ψ

NORTH FINDING SYSTEM

BACKGROUND OF THE INVENTION

This invention relates to a north finding system implemented as gyrocompassing apparatus intended for use on ground based equipment such as antenna pedestals, projectile launchers, and like equipment requiring north reference information. The gyrocompassing implementation enables utilization of high grade state-of-the-art inertial sensors and yet achieves the desired results economically. The north finding system provides high accuracy with fast reaction time over a wide temperature range without the need for auxilliary equipment such as heaters or the like. The system is specifically configured to tolerate settling and/or oscillatory base motion without additional reaction time or degradation of gyrocompassing accuracy, as is the case with prior art north finding systems. This feature is important in applications where host equipment base settling, personnel movement, and wind factors for example, impose a dynamic gyrocompassing environment.

One relatively low cost configuration considered for a north finding system for the purposes required features a strapdown package using a conventional single spinning wheel gyroscope (gyro). While such an arrangement is adequate with small tilt angles and with no base motion, or with a relatively non-stringent gyrocompassing accuracy, it suffers from temperature sensitive mass unbalance effects which cause apparent gyro bias shifts for each specific combination of temperature and tilt. Without temperature control, which adds to the complexity of the apparatus, only a few degrees of deviation from the reference causes gyrocompassing errors which are unacceptable for the purposes intended. Further, this temperature sensitivity of rotating mass gyros affects both accuracy and reaction time. Accordingly, an important feature of the present invention is that it is virtually temperature insensitive and exhibits no mass unbalance effects.

Ground based installations for which the present invention is intended have a tendency to settle when emplaced. Settling can be caused either by a slow sinking of a vehicle or other structure into the terrain, or by the suspension system supporting the installation compressing from its running state. Any sensed angular rate contaminates the earth rate reading which a strapdown gyro measures to find north. A relatively small settling rate can cause a substantial gyrocompassing error which is magnified at higher latitudes. The present invention features high performance accelerometers coupled with a sophisticated software program to compensate for the settling angle.

Rotational vibration creates another problem observed in some north seeking arrangements. The present invention obviates this disadvantage by using a ring laser gyro with a high bandwidth and low quantization, which allows accurate motion reconstruction during high angular rate movements to permit the ring laser gyro read-out electronics to operate at relatively high angular rates.

It should also be noted that lateral vibrational inputs measured by accelerometers used to compensate gyro outputs do not present a problem. These varying measurements average to an acceptable level over a period of time. Another advantage of the present invention is the virtually instant turn on time, independent of temperature. Thus, the north finding arrangement herein disclosed has been observed to be ready only three seconds after applying power, thereby allowing a longer gyrocompassing average time then conventional arrangements which take much longer to reach operational steady state spin rate and specified accuracy. Further, the present invention overcomes the susceptibility of conventional gyro run up time due to the lower extremes of operational temperature ranges observed and due to aging of the gyro bearing lubricants.

A properly designed three gimbal platform arrangement, constructed around spinning wheel inertial rate gyros which are levelled, may serve the purposes intended. In an arrangement of this type the levelled platform isolates the north seeking gyro from tilt and rotational movements. The arrangement disclosed in commonly assigned U.S. Pat. No. 4,686,771 issued on Aug. 18, 1987 to Thomas Beneventano, et al. also serves the purposes intended. However, the arrangement of the present invention has been found to be more desirable than that taught by the prior art as aforenoted.

SUMMARY OF THE INVENTION

This invention contemplates a north finding system including a platform module, a control and display unit and system electronics. The platform module is configured as a platform including inertial instruments mounted on a pivot for implementing gyrocompass indexing positions. The system electronics includes gyro support electronics, a microprocessor and indexing circuitry, all of which provide the required control, compensation, computation and interface functions.

The platform pivot provides a capability for indexing the inertial instruments to the various positions required for gyrocompassing. The pivot is driven by a torquer to provide drive capability and a resolver provides angular readout. A pivot lock which otherwise functions to strapdown the platform is energized (released) to allow pivot rotation.

Gyrocompassing information is always collected with the pivot locked. A gyro, which in the preferred embodiment of the invention is a ring laser gyro, measures earth's rate. Accelerometers are used to measure gyro tilt and host equipment and base motion in the gyrocompassing implementation.

The system electronics provides microprocessor control of the indexing pivot. Pivot lock drive electronics is activated for releasing the pivot for indexing and deactivated for relocking the pivot. Torquer drive electronics energizes the pivot torquer in response to pivot rotating commands. Resolver electronics provides for required pivot positioning and referencing of the inertial instruments to platform module mounting pads.

The system electronics also includes a DC/DC power converter which accepts an unregulated 28 volt DC external input, and produces the required regulated DC voltages. An electromagnetic interference filter included in the converter insures electromagnetic compatibility. Power conversion electronics are included to produce the required sinusoidal excitation for the indexing pivot resolver.

The control and display unit, in addition to a key pad for input to the platform module, also has an integrally mounted display capability. The display is controlled by the microprocessor and is energized via a display driver. Besides displaying north references, roll and cross-roll information is presented. Operationally, the platform module senses earth's rate and gravity along with base motion. Output data from the platform, appropriately conditioned and digitized by the system electronics, is applied to the microprocessor. Initial software processing of the platform data compensates for various gyro and accelerometer parameters. The software processing also provides the electronics with reference values for proper ring laser pathlength and dither control of the ring laser gyro. Resolver data is utilized in the indexing mode for determining proper positioning of the platform for gyrocompassing. The software initiates the indexing commands which control the pivot lock and torque drives. After compensation, the gyro and accelerometer data is operated on by software algorithms to obtain best estimates of rate and tilt information prior to performing gyrocompass and tilt computations. Interface functions for remote operation of the platform module are under software control, and software also controls outputs to the control and display unit and accepts control and display unit key pad inputs for local operation of the system.

DETAILED DESCRIPTION OF THE INVENTION

Figure 1:
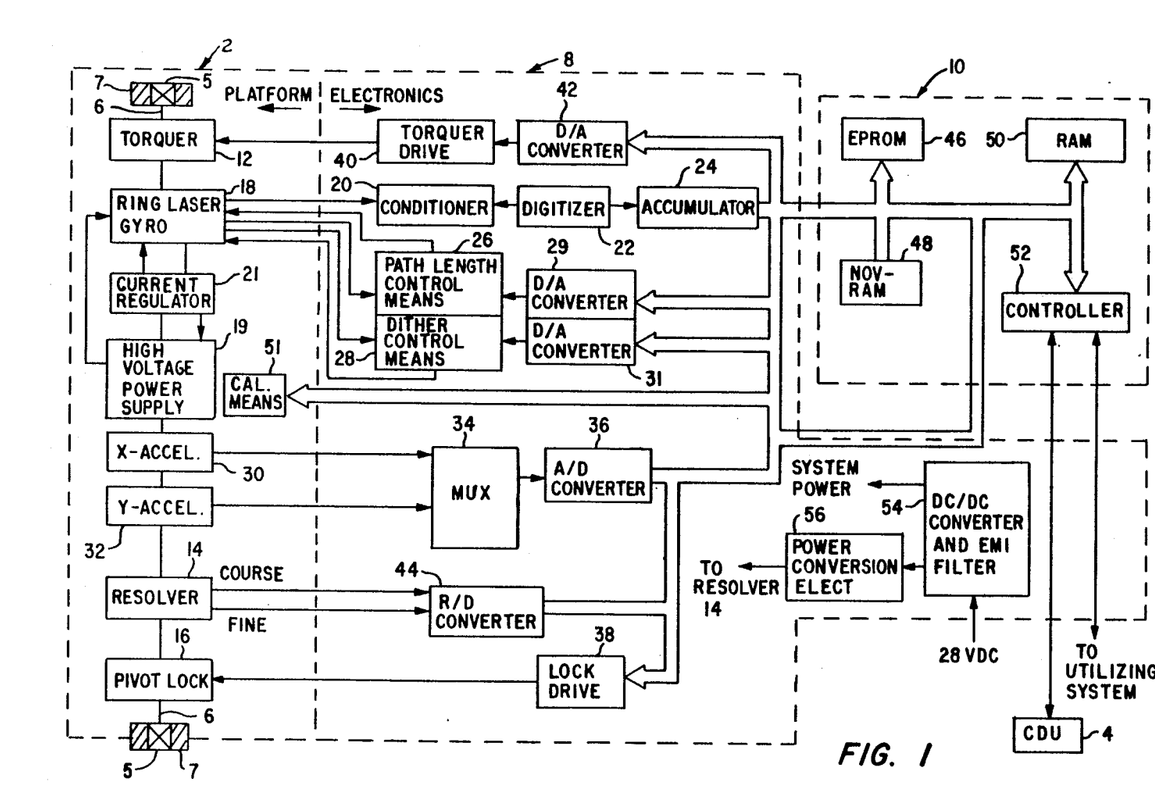
FIG. 1 is a functional block diagram of a north finding system in accordance with the invention.

With reference to Figure a platform module is designated generally by the numeral 2 and a control and display unit (CDU) is designated generally by the numeral 4. Platform module 2 includes the several inertial instruments of the system which are mounted on a pivot 6. Pivot 6 is utilized to implement gyrocompassing indexing positions as will hereinafter be explained.

North finding system electronics is designated generally by the numeral 8 and includes gyro support circuitry and pivot indexing circuitry. A microprocessor is designated generally by the numeral 10. System electronics 8 and microprocessor 10 provide the required control, compensation, computation and interface functions for the system.

Pivot 6 rotatably supported by bearings 5 in a case or housing 7, provides the capability for indexing the several inertial instruments to the various positions required for gyrocompassing. Pivot 6 supports a torquer 12 to provide a drive capability, a resolver 14 to provide angular read-out and a pivot lock 16 which is energized to allow rotation or indexing of pivot 6 but is otherwise locked to "strapdown" the platform module.

Gyrocompassing data is always collected with pivot 6 locked, i.e. lock 16 de-energized. A gyroscope (gyro) 18, which in the preferred embodiment of the invention is a ring laser gyro, measures earth's rate and provides a fringe rate signal that is a frequency modulated analog signal with a frequency proportional to rotational rate. This signal is conditioned, digitized and accumulated via conditioner 20, digitizer 22 and accumulator 24 for software processing. Ring laser gyro 18 provides laser beam intensity signals and dither instantaneous amplitude signals. These signals are processed via pathlength control means 26 and dither control means 28 which are controlled by microprocessor 10 via D/A converters 29 and 31, respectively, as indicated in FIG. 1. Ring laser gyro 18 is powered by a high voltage power supply 19 via a current regulator 21.

X-accelerometer 30 and Y-accelerometer 32 are used to measure the tilt of gyro 18 and to measure host equipment base motion in the gyrocompassing implementation. Outputs provided by accelerometers 30 and 32 are analog DC voltages which are multiplexed via a multiplexer (MUX) 34 and digitized via an A/D converter 36, and thereafter applied to microprocessor 10. In another embodiment, these voltages would be processed by voltage to frequency (V/F) converters, and thereafter applied to microprocessor 10.

System electronics 8 provides microprocessor control of pivot 6 as aforenoted. A lock drive 38 is activated by microprocessor 10 to release pivot 6 for rotation and is deactivated by the microprocessor for relocking the pivot.

A torquer drive 40 energizes torquer 12 in response to torquer commands provided by microprocessor 10 via a D/A converter 42 to index pivot 6. Resolver information, i.e. course and fine, is digitized by a resolver to digital (R/D) converter 44 to provide the required pivot positioning and referencing of the several inertial instruments to platform module mounting pads.

Microprocessor 10 is of the type which uses a conventional MIL-STD-1750A based chip and a complement of peripherals. Memory is comprised of an EPROM module 46, a NOVRAM module 48 and a RAM module 50. A NOVRAM calibration means 51 is utilized for storage of inertial instrument and alignment calibration constants and permits updating of these parameters when required. A dual serial communications controller 52 provides a serial link on one channel for remote communication with a utilizing system computer (not otherwise shown). A second channel is utilized for CDU local operation.

Systems electronics 8 includes a DC/DC converter 54 with an electromagnetic interference (EMI) filter to assure electromagnetic compatibility and includes power conversion electronics 56 for producing the required sinusoidal excitation for resolver 14.

In regard to control and display unit (CDU) 4, in addition to a key pad for inputting to platform 2, a control and display unit housing has an integrally mounted display capability. The display is controlled by microprocessor 10 and energized by a display driver (not otherwise shown). Besides displaying north reference, roll and cross-roll information is also displayed. Only as much of control and display unit 4 as is necessary to understand its function in relation to the invention has been herein described, the same being now understood by those skilled in the art.

Figure 2:
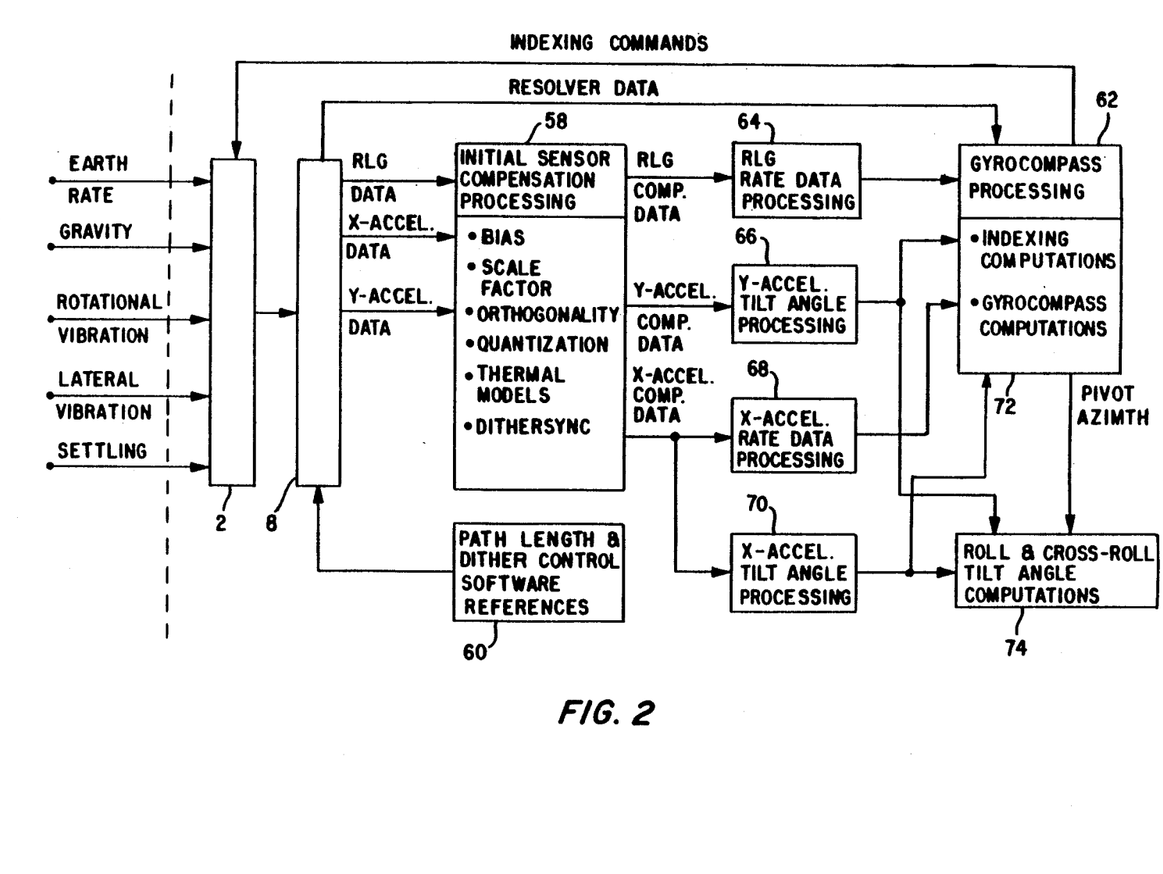
FIG. 2 is a block diagram outlining the north finding system software functions.

With reference to FIG. 2, platform module 2 senses earth's rate and gravity along with base motion parameters including rotational vibration, lateral vibration and settling. Output data from the platform module is appropriately conditioned and digitized by system electronics 8 and is applied to microprocessor 10 (FIG. 1). Thus, data from ring laser gyro (RLG) 18, X-accelerometer 30 and Y-accelerometer 32 are processed to compensate for various gyro and accelerometer parameters including bias, scale factor, orthogonality, quantization, thermal models, and dither synchronization by a software module 58. A software module 60 provides system electronics 8 with the reference values for proper pathlength and dither control of ring laser gyro 18.

Data from resolver 14 is applied to a software module 62 for determining proper positioning of pivot 6 for gyrocompassing. Module 62 initiates the indexing commands which control pivot lock 16 and torquer drive 40.

After suitable compensation and processing by modules 64, 66, 68 and 70, gyro and accelerometer data are operated on by software algorithms to obtain best estimates of rate and tilt information prior to performing gyrocompass and tilt computations via software modules 72 and 74. Software module 72 includes the base motion compensation algorithms.

Figure 3A:
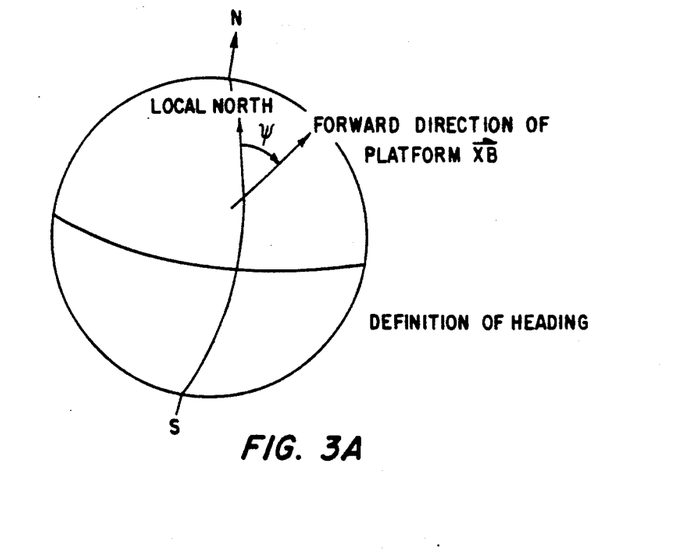
FIGS. 3A, 3B and 3C are diagrammatic representations illustrating the objective of gyrocompassing, i.e. to determine the angle from true north of the forward direction of the north finding system.
Figure 3B:
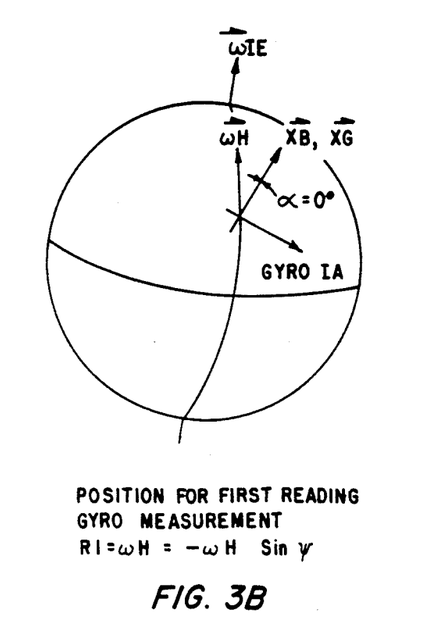
Figure 3C:
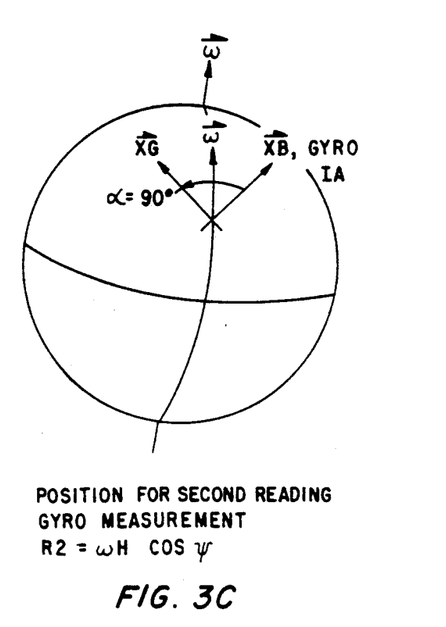

In order to better understand the invention it should be recognized that the objective of gyrocompassing is to determine the angle from true North ($\psi$) of the forward direction (X axis) of platform module 2, as indicated in FIGS. 3A, 3B and 3C. With reference to said Figures, a gyro measures the component of inertial rotational rate about its case-fixed input axis (IA). In this case, the gyro takes two rotational rate measurements in order to accurately determine the direction of the spin vector of the earth. Of course, this vector is the earth's North-South axis. This method is analogous to using a compass to find the direction of the magnetic field of the earth in order to determine magnetic North. If platform case 7 is level (its XY plane is tangential to the earth's surface), the gyro IA is then in a level plane. In this case, two gyro readings, 90 degrees apart, will provide the data necessary to determine heading. If case 7 is not level, it is still possible to determine heading by taking tilt into account. Tilt is measured by accelerometers 30 and 32 mounted along two orthogonal axes in the platform XY plane.

At any point on the earth, the earth's spin vector has a component tangential to the earth's surface (known as the "horizontal component of earth's rate", $\omega H$) and another component (not shown) normal to the surface (the "vertical component of earth's rate $\omega V$). For a spherical earth, $\omega H$ and $\omega V$ are functions of latitude only, and are given by:

$$\omega H = \omega IE \cos L, \text{ and}$$

$$\omega V = \omega IE \sin L,$$

Where $\omega IE$ is the total magnitude of the earth's rotation rate (15.041 degrees/hour) and L is latitude. Conveniently, $\omega H$ always locally points North, so the platform calculates heading as the angle between $\omega H$ and the horizontal projection of the platform X axis.

A two-position gyrocompassing method uses a single gyro mounted so the input axis of the gyro can rotate to any direction in the XY plane of the platform. FIGS. 3A, 3B and 3C illustrate the gyrocompassing method when the plane of the platform is tangent to earth's surface. When the platform case is level, the gyro IA is kept in a level plane, and is only subject to components of $\omega H$.

The body frame of reference is attached to the platform, and the XB direction is considered "forward." A gyro gimbal frame of reference is level with the body frame, and the gimbal angle $\alpha$ is the angle between XB and XG. The gyro IA is mounted along the Y axis of the gimbal frame.

As shown in FIGS. 3A, 3B and 3C, the resulting gyro readings, R1 and R2, are:

$$R1 = -\omega H \sin\psi; \text{ and}$$

$$R2 = \omega H \cos \psi.$$

It is now obvious that heading may be determined by the four-quadrant arctangent function:

$$\psi = \arctan(-R1/R2).$$

When the platform is not level, the problem is somewhat more complicated. First, the relationship between the gimbal frame and the surface of the earth has changed; second a portion of the vertical component of earth's rate is now sensed by the gyroscope, since the IA is no longer horizontal; and third, any tilt rates may be sensed as rotation rates by the gyro. All three of the above phenomena degrade the two readings.

At this point, accelerometers 30, 32 are used. Accelerometer 30 is mounted along the XG axis, and accelerometer 32 is mounted along the YG axis. The accelerometers measure a component of the gravitational vector, which points in the same direction as $\omega V$. The accelerometers give enough information to estimate the tilts and tilt rates. After compensation for tilt, tilt rate, and $\omega V$, the two gyro readings are combined to give estimates of $\omega H \cos\psi$ and $\omega H \sin\psi$. Once again a four-quadrant arctangent is used to provide heading.

In the preferred embodiment of the invention, heading is measured using ring laser gyro 18 with its input axis along YG, accelerometer 30 with its input axis along XG, and accelerometer 32 aligned along YG. It has been determined that two sets of measurements, one with an azimuth gimbal angle ($\alpha$) of 0 degrees and the other with an angle ($\alpha$) of 90 degrees, each lasting 220 seconds, will provide heading ($\psi$) within the desired accuracy.

Figure 4:
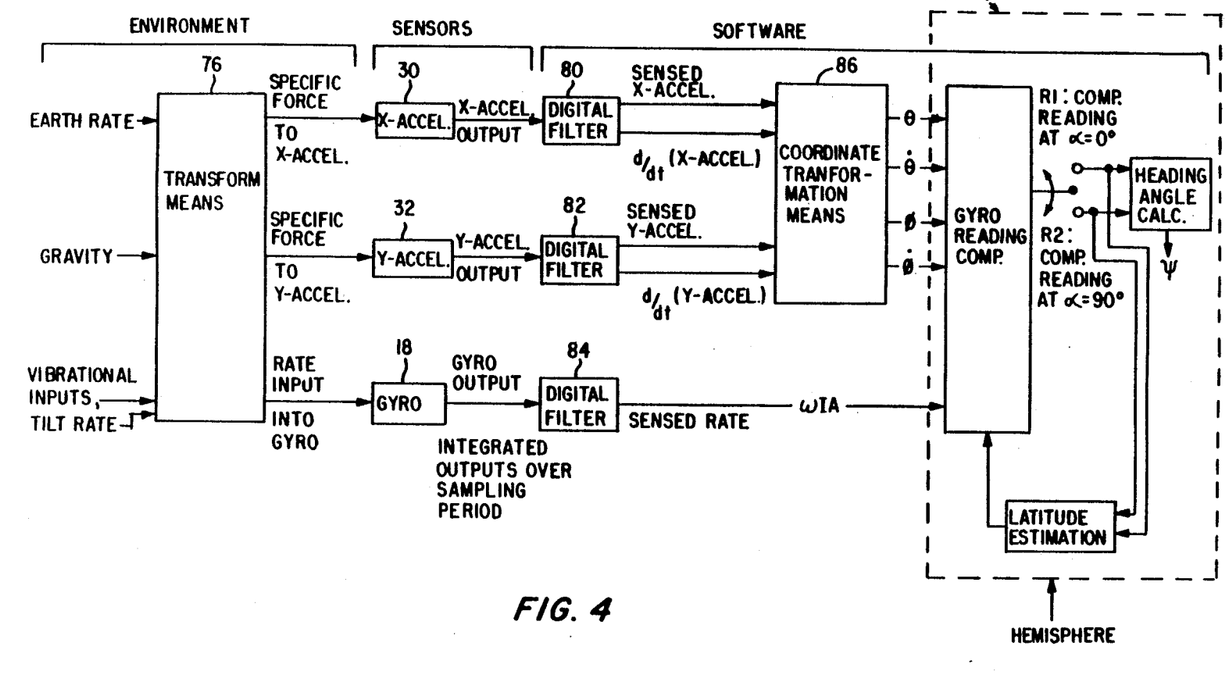
FIG. 4 is a block diagram illustrating the operation of the north finding module.

The operation of platform 2 is shown with reference to FIG. 4. First, environment inputs, i.e. earth's rate, gravity, vibrational inputs and tilt rate combine via a transform means 76 to provide inputs to the three inertial sensors (gyro 18, accelerometer 30 and accelerometer 32) in their frames of reference. The only desired input is the horizontal component (locally tangent to the surface of the earth) of earth's rate along gyro input axis IA. The purpose of a software module 78 is to compensate for the undesired components of the input signals and calculate heading after filtering via digital filters 80, 82 and 84 and coordinate transformation of the filtered accelerometer outputs via transformation means 86.

Accelerometers 30 and 32 are mounted on platform 2, which defines the gimbal reference frame. Heading is defined with respect to the heading reference frame.

Therefore, coordinate transformations are required to make the inertial measurements useful for the heading estimation algorithm. Coordinate transformation means 86 provides outputs θ and θ as indicated in FIG. 4, and which outputs are applied to software module 78 for the required calculations.

Figure 5A:
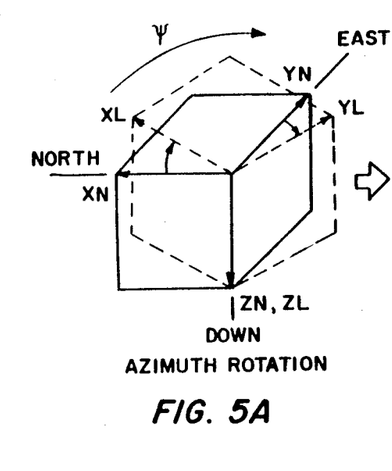
FIGS. 5A, 5B, 5C and 5D are diagrammatic representations illustrating the relationship between gimbal and heading reference frames and the definitions of roll and cross roll as required for understanding the present invention.
Figure 5B:
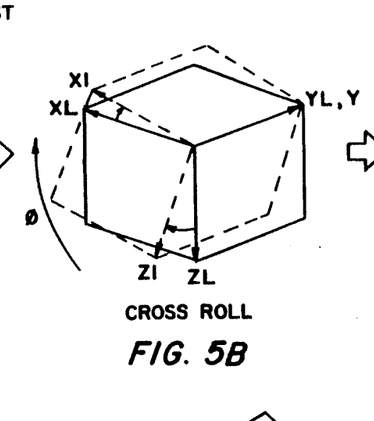
Figure 5C:
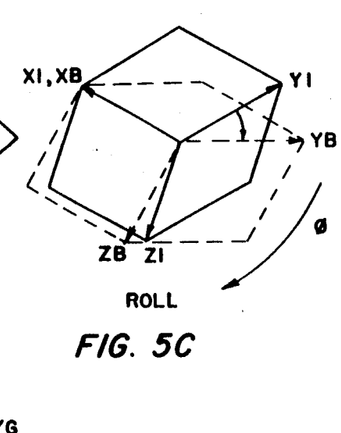
Figure 5D:
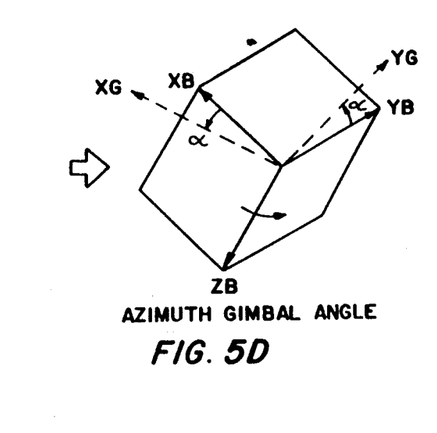

The relationship between the gimbal and heading reference frames and the definitions of roll and cross-roll as required to understand the invention are described in FIGS. 5A–5D. The Figures show the rotations that relate the various reference frames. The heading reference frame (N frame) is a geographic frame with axes XN North, YN East, and ZN down (FIG. 5A). The level frame (L frame) is obtained by rotating (azimuth rotation) the N-frame about ZN through the angle ψ. The body frame (B frame) is obtained by first rotating the L frame about YL through θ (cross-roll, or pitch angle, FIG. 5B) and then rotating this new frame about its X axis through φ (roll angle, FIG. 5C). Finally, the azimuth gimbal frame, on which the inertial instruments are mounted, is obtained by rotating the body frame through −α about ZB (FIG. 5D).

It will now be understood that assuming a spherical earth, the rotation of the earth can be expanded in the L frame to have a component along XL(ωH) and a component along ZL(−ωV). If any tilts are present, a component of ωV is aligned along the gyro input axis, and a component of gravity is applied to the accelerometer input axes. Tilt rates are also capable of coupling directly into the gyro input.

For the gyro the output is a digitally integrated rotation rate (accumulated angle) over the past sample period. The accelerometer outputs are specific forces over the past sample period. The accelerometer output signals are conditioned before being applied to A/D converter 36 (FIG. 1) in order to reduce the errors due to resolution and non-linearity of the A/D converter. All of these sensor outputs must be converted into the desired data, i.e. actual specific forces along XG and YG, rates of change of these specific forces, and rotation rate about YG.

In regard to the digital filtering referred to with reference to FIG. 4, accelerometer specific force and rate of change of specific force must be estimated from the sampled data. The selected estimation method is to perform digital processing of the samples of integrated specific force over the collection time. Similar digital processing is used to obtain the value of sensed rotation rate from the sampled gyro output.

The estimated rotation rate from the filtered gyro output is useful as sensed rotation rate, but the filtered accelerometer outputs (specific forces and time derivatives) must go through a coordinate transformation to obtain the values of θ, dθ/dt (θ̇), φ, and dφ/dt/(φ̇) as shown with reference to FIG. 4.

In regard to the gyro reading compensation also described with reference to FIG. 4, the sensed rotation rate is:

$\omega IA = \omega H \cos\psi(\cos\theta\sin\alpha + \sin\theta\sin\phi\cos\alpha) -$ $\omega H \sin\psi\cos\phi\cos\alpha + \omega V(\sin\theta\sin\alpha - \cos\theta\sin\phi\cos\alpha) +$ $d\psi/dt(\cos\theta\sin\phi\cos\alpha - \sin\theta\sin\alpha) + d\theta/dt \cos\theta\cos\alpha + d\phi/dt \sin\alpha.$ All of the terms in the above equation, except for the first two, must be compensated for or neglected. The term containing dφ/dt cannot be estimated using any combination of accelerometer or gyro outputs, so it must be neglected. Fortunately, it is small relative to the other terms and becomes insignificant when averaged over the measurement time interval. The filtered accelerometer outputs (FIG. 4) give θ, dθ/dt, φ, and dφ/dt, so all that is not known is ωH and ωV. These require knowledge of latitude, which is not given.

Using the above equation for ωIA, the values of the readings are:

$R1 = \omega IA$ at $\alpha = 0$
$= \omega H \cos\psi\sin\theta\sin\phi - \omega H \sin\psi\cos\phi - \omega V \cos\theta\sin\phi +$
$d\psi/dt \cos\theta\sin\phi + d\theta/dt \cos\phi;$ and $R2 = \omega IA$ at $\alpha = 90$ degrees
$= \omega H \cos\psi\cos\theta + \omega V \sin\theta - d\psi/dt \sin\theta + d\phi/dt.$ An iterative method is required to estimate latitude. When the latitude iteration converges, the final compensated readings are used to calculate heading via:

$$\psi = \arctan\left[\frac{\omega H \sin\psi}{\omega H \cos\psi}\right] \approx \arctan(-R1/R2)$$

The only information necessary for successful convergence of the latitude estimation iteration is the hemisphere (northern or southern) of the location of platform 2.

Roll and cross-roll tilt estimates are available at all times, without affecting the gyrocompassing algorithm. The mechanism for calculating these tilt values is the same as that used to calculate θ and φ for gyrocompassing. A separate digital filter (not shown) designed for a different measurement time, is used. The tilt outputs can be accessed during or after gyrocompassing, as frequently as every six seconds, if desired.

Figure 6:
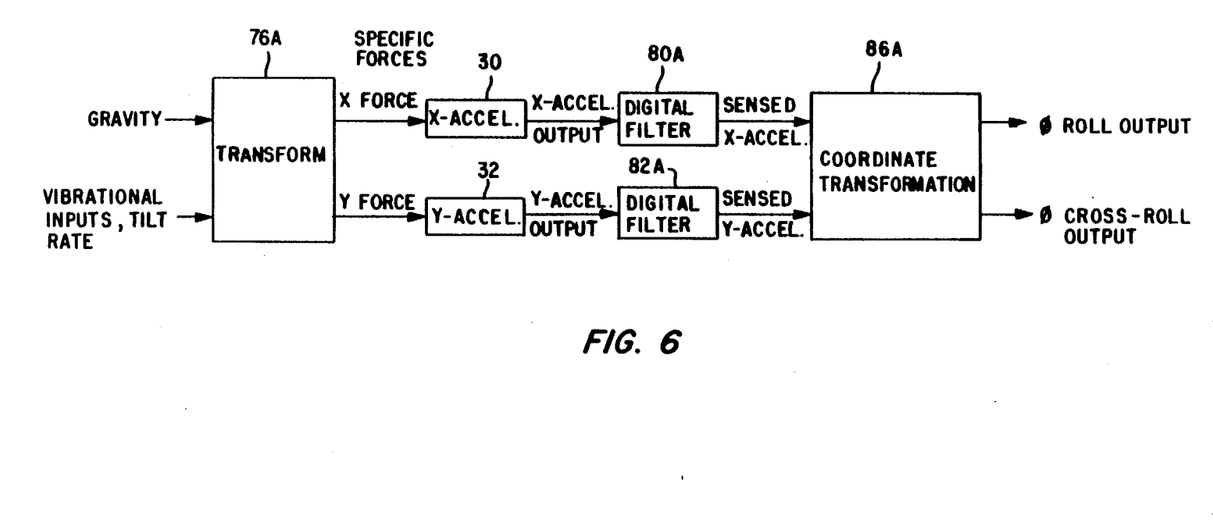
FIG. 6 is a block diagram illustrating the tilt angle calculation procedure according to the invention.

In this regard reference is made to FIG. 6 which shows a configuration similar to that of FIG. 4. Thus gravity, vibrational and tilt rate inputs are transformed to the gimbal frame via transform means 76A to provide specific X and Y forces which are applied to X and Y accelerometers 30 and 32. The accelerometer outputs are applied to digital filters 80A and 82A and the sensed acceleration outputs therefrom are applied to coordinate transformation means 86A for the reasons aforenoted. Transformation means 86A provides the required roll and cross-roll outputs.

Figure 7:
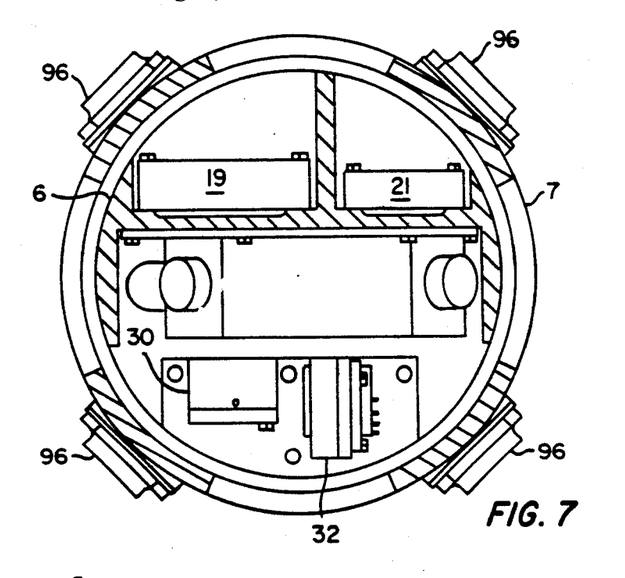
FIG. 7 is a partially sectioned top plan view illustrating the structural configuration of the invention.
Figure 8:
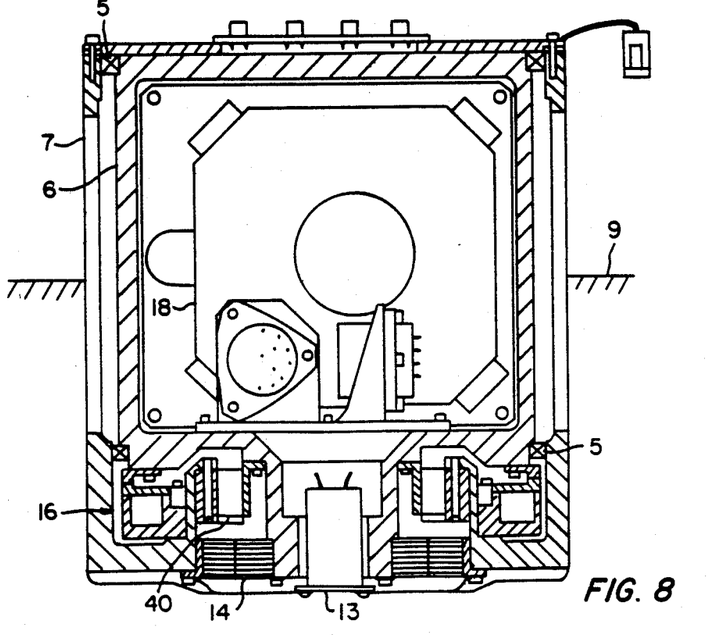
FIG. 8 is a partially sectioned front elevation view illustrating the structural configuration of the invention.

The structural configuration of platform 2 is particularly shown in FIGS. 7 and 8. The featured platform structure includes pivot 6 journaled via bearings 5 in housing 7 mounted to a host equipment base 9. Pivot 6 is a mounting member for ring laser gyro 18, accelerometers 30 and 32, high voltage power supply 19 and current regulator 21, the same being first referred to with reference to FIG. 1.

Pivot 6 is a single axis of rotation pivot which allows ring laser gyro 18 and accelerometers 30 and 32 to be indexed to data collection positions. The pivot is arranged as a platform for mounting the ring laser gyro, the accelerometers, the high voltage power supply and the current regulator. Bearings 5 are two angular-contact thin section ball bearings. The bearings are preloaded to preclude pivot lift-off during shock and vibration, but load force is kept to a low value to minimize power consumption as will now be understood by those skilled in the art. Torquer motor 40 mounted to pivot 6 is a brush type, frameless, large bore standard DC torquer motor and is used to power the pivot to its indexing positions. Position information is provided b resolver 14 which is a two speed resolver mounted to pivot 6 below the torquer motor.

To counter-act the cross coupling effects of the ring laser gyro dither mechanism, pivot lock 16 is provided. Pivot lock 16 is electromagnetically actuated, and when the pivot lock is de-energized the pivot is locked to housing 7. When energized the pivot is free to rotate. In this regard it will be understood that pivot lock 16 includes an electromagnetic stator, a pivot mounted rotor and a lock pad. The lock pad moves axially between the rotor and stator and is mounted to the housing through an axially flexible diaphragm spring member. The lock pad is stiff rotationally and locks the pivot to the housing when the pad is spring loaded against the lock rotor in the de-energized state. Electrical connections between the pivot mounted components and housing 7 are made through a slip ring assembly 13 as will be understood by those skilled in the art.

The disclosed arrangement must be isolated from the housing structure in order to prevent ring laser gyro 18 from exciting any housing resonances. In this regard it will be understood that gyro performance improves as peak dither rate increases. If energy is lost due to housing vibration, then less energy is available for dithering and gyro performance suffers. For this reason the platform is made very stiff so that there are no resonances near the dither frequency. Additionally, the platform is isolated from the surrounding structures via a plurality of circumferentially disposed isolators 96 as particularly shown in FIG. 7. As a side benefit, the isolators effectively dampen out vibrations above 200 Hz, for example so as to prevent spurious disturbances from affecting the platform. With continued reference to FIG. 7, it will be understood that the isolators support housing 7 and bearings 5 that allow the pivot to index.

There has thus been described a gyrocompassing system intended for land based equipment requiring north reference information. A novel gyrocompass implementation enables utilization of high grade inertial sensors while achieving the desired goal of moderate cost. The north finding system is designed to provide high accuracy with fast reaction time over a wide temperature range without the aid of heaters and other auxilliary equipment. The arrangement is specifically configured to tolerate settling and/or oscillatory base motion without requiring additional reaction time or causing degradation of gyrocompassing accuracy.

What is claimed is:

1. A north finding system of the type mounted to ground based equipment for providing a north reference for said equipment, and including platform means and control means, said north finding system comprising:
    the platform means including a case and a pivot rotatably supported by the case for being indexed to a plurality of positions;
    means coupled to the pivot for rotatably driving the pivot to index said pivot to the plurality of positions;
    first signal providing means coupled to the pivot for providing signals corresponding to the angular position of said pivot;
    means coupled to the pivot for locking the pivot to prevent said pivot from being rotatably driven and for thereby strapping down the platform means, and for otherwise unlocking said pivot;
    gyroscope means coupled to the pivot for sensing earth's rate when the platform means is strapped down, and thereupon being in a gyrocompassing mode and providing gyrocompassing signals;
    second signal providing means coupled to the pivot and providing signals corresponding to the tilt of the gyroscope means and signals corresponding to the motion of the ground based equipment when the gyroscope means is in the gyrocompassing mode;
    the control means including means connected to the gyroscope means and to the first and second signal providing means and responsive to the signals therefrom for compensating for predetermined gyroscope means tilt and ground based equipment base motion parameters, and including means for controlling the means for rotatably driving the pivot and means for controlling the pivot locking and unlocking means; and
    the pivot locking and unlocking means including a pivot lock coupled to the pivot and lock drive means connected to the pivot lock and to the control means for activating the pivot lock to unlock the pivot, and for deactivating said pivot lock to lock said pivot.

2. A north finding system of the type mounted to ground based equipment, for providing a north reference for said equipment, and including platform means and control means, said north finding system comprising:
    the platform means including a case and a pivot rotatably supported by the case for being indexed to a plurality of positions;
    means coupled to the pivot for rotatably driving the pivot to index said pivot to the plurality of positions;
    first signal providing means coupled to the pivot for providing signals corresponding to the angular position of said pivot, said first signal providing means including a resolver means coupled to the pivot, means connected to the resolver means for exciting said resolver means for providing resolver signals corresponding to the angular position of the pivot, a resolver to digital converter connected to the resolver means for converting the resolver signals to digital signals and connected to the control means for applying the digital signals thereto, and the control means being responsive to the digital signals for controlling the pivot driving means for rotatably driving the pivot and for controlling the pivot locking and unlocking means;
    means coupled to the pivot for locking the pivot to prevent said pivot from being rotatably driven and for thereby strapping down the platform means, and for otherwise unlocking said pivot;
    gyroscope means coupled to the pivot for sensing earth's rate when the platform means is strapped down, and thereupon being in a gyrocompassing mode and providing gyrocompassing signals;
    second signal providing means coupled to the pivot and providing signals corresponding to the tilt of the gyroscope means and signals corresponding to the motion of the ground based equipment when the gyroscope means is in the gyrocompassing mode, said second signal providing means including a first accelerometer mounted along a first axis of the platform means and providing a first output, a second accelerometer mounted along a second axis of the platform means and providing a second output, said first and second axes being orthogonal and defining a plane which is tangential to the earth's surface when the platform means is level, means for multiplexing the first and second outputs and for providing an analog multiplexed output, means for converting the analog multiplexed output to a digital output, and the compensating means included in the control means connected to the first and second accelerometers and responsive to the first and second outputs therefrom for compensating for gyroscope means tilt and ground based equipment base motion parameters; and the control means including means connected to the gyroscope means and to the first and second signal providing means and responsive to the signals therefrom for compensating for predetermined gyroscope means tilt and ground based equipment base motion parameters, and including means for controlling the means for rotatably driving the pivot and means for controlling the pivot locking and unlocking means.

3. A north finding system as described by claim 2, wherein the means coupled to the pivot for rotatably driving the pivot to index said pivot to the plurality of positions includes:

pivot driving means coupled to the pivot;

energizing means connected to the pivot driving means;

the control means providing digital signals for controlling the pivot driving means for rotatably driving the pivot; and a digital to analog converter connected to the control means and to the energizing means for converting the digital signals to analog signals and for applying said analog signals to the energizing means.

4. A north finding system as described by claim 2, wherein the means coupled to the pivot for locking and unlocking the pivot includes:

a pivot lock coupled to the pivot;

lock drive means connected to the pivot lock and to the control means and controlled by the control means for activating the pivot lock to unlock the pivot, and for deactivating said pivot lock to lock said pivot.

5. A north finding system as described by claim 2, wherein the gyroscope means coupled to the pivot for sensing earth's rate when the platform is strapped down, and thereupon being in a gyrocompassing mode and providing gyrocompass signals includes:

a ring laser gyro for providing frequency modulated analog signals corresponding to earth's rate;

means connected to the ring laser gyro for processing the frequency modulated analog signals therefrom and for providing corresponding digital gyrocompassing signals; and the control means including means responsive to the digital gyrocompassing signals for providing north reference signals.

6. A north finding system as described by claim 5, including:

the ring laser gyro providing laser beam intensity signals and dither instantaneous amplitude signals;

the compensating means included in the control means providing first and second ring laser gyro parameter compensating signals;

pathlength control means connected to the ring laser gyro and to the control means and responsive to the laser beam intensity signals and the first ring laser gyro parameter compensating signal for controlling the ring laser gyro pathlength; and dither control means connected to the ring laser gyro and the control means and responsive to the dither instantaneous amplitude signals and the second ring laser gyro parameter compensating signal for controlling ring laser gyro dither.

7. A north finding system as described by claim 5, including:

a high voltage power supply; and a current regulator connected to the ring laser gyro and to the high voltage power supply for powering the ring laser gyro.

8. A north finding system of the type mounted to ground based equipment for providing a north reference for said equipment, and including platform means and control means, said north finding system comprising:

the platform means including a case and a pivot rotatably supported by the case for being indexed to a plurality of positions;

means coupled to the pivot for rotatably driving the pivot to index said pivot to the plurality of positions;

first signal providing means coupled to the pivot for providing signals corresponding to the angular position of said pivot;

means coupled to the pivot for locking the pivot to prevent said pivot from being rotatably driven and for thereby strapping down the platform means, and for otherwise unlocking said pivot;

gyroscope means coupled to the pivot for sensing earth's rate when the platform means is strapped down, and thereupon being in a gyrocompassing mode and providing gyrocompassing signals;

second signal providing means coupled to the pivot and providing signals corresponding to the tilt of the gyroscope means and signals corresponding to the motion of the ground based equipment when the gyroscope means is in the gyrocompassing mode;

the control means including means connected to the gyroscope means and to the first and second signal providing means and responsive to the signals therefrom for compensating for predetermined gyroscope means tilt and ground based equipment base motion parameters, and including means for controlling the means for rotatably driving the pivot and means for controlling the pivot locking and unlocking means; and the first signal providing means including resolver means coupled to the pivot, means connected to the resolver means for exciting said resolver means for providing resolver signals corresponding to the angular position of the pivot, a resolver to digital converter connected to the resolver means for converting the resolver signals to digital signals and connected to the control means for applying the digital signals thereto, and the control means being responsive to the digital signals applied thereto for controlling the pivot driving means for rotatably driving the pivot and for controlling the pivot locking and unlocking means.

9. A north finding system of the type mounted to ground based equipment for providing a north reference for said equipment, and including platform means and control means, said north finding system comprising:
the platform means including a case and a pivot rotatably supported by the case for being indexed to a plurality of positions;
means coupled to the pivot for rotatably driving the pivot to index said pivot to the plurality of positions;
first signal providing means coupled to the pivot for providing signals corresponding to the angular position of said pivot;
means coupled to the pivot for locking the pivot to prevent said pivot from being rotatably driven and for thereby strapping down the platform means, and for otherwise unlocking said pivot;
gyroscope means coupled to the pivot for sensing earth's rate when the platform means is strapped down, and thereupon being in a gyrocompassing mode and providing gyrocompassing signals;
second signal providing means coupled to the pivot and providing signals corresponding to the tilt of the gyroscope means and signals corresponding to the motion of the ground based equipment when the gyroscope means is in the gyrocompassing mode;
the control means including means connected to the gyroscope means and to the first and second signal providing means and responsive to the signals therefrom for compensating for predetermined gyroscope means tilt and ground based equipment base motion parameters, and including means for controlling the means for rotatably driving the pivot and means for controlling the pivot locking and unlocking means;
the means coupled to the pivot for rotatably driving the pivot including a pivot driving means coupled to the pivot, energizing means connected to the pivot driving means, the control means providing digital signals for controlling the pivot driving means for rotatably driving the pivot, and a digital to analog converter connected to the control means and to the energizing means for converting the digital signals to analog signals and for applying said analog signals to the energizing drive means; and
the pivot locking and unlocking means including a pivot lock coupled to the pivot, and lock drive means connected to the pivot lock and to the control means and controlled by the control means for activating the pivot lock to unlock the pivot, and for deactivating said pivot lock to lock said pivot.

10. A north finding system as described by claim 9, wherein the first signal providing means includes:
resolver means coupled to the pivot;
means connected to the resolver means for exciting said resolver means for providing resolver signals corresponding to the angular position of the pivot;
a resolver to digital converter for converting the resolver signals to digital signals, and connected to the control means for applying the digital signals thereto; and
the control means being responsive to the digital signals applied thereto for applying digital control signals to the digital to analog converter which converts said digital signals to analog signals, said analog signals being applied to the energizing means for controlling said means, and for applying control signals to the pivot lock for locking and unlocking said pivot lock.

11. A north finding system of the type mounted to ground based equipment for providing a north reference for said equipment, and including platform means and control means, said north finding system comprising:
the platform means including a case and a pivot rotatably supported by the case for being indexed to a plurality of positions;
means coupled to the pivot for rotatably driving the pivot to index said pivot to the plurality of positions;
first signal providing means coupled to the pivot for providing signals corresponding to the angular position of said pivot;
means coupled to the pivot for locking the pivot to prevent said pivot from being rotatably driven and for thereby strapping down the platform means, and for otherwise unlocking said pivot;
gyroscope means coupled to the pivot for sensing earth's rate when the platform means is strapped down, and thereupon being in a gyrocompassing mode and providing gyrocompassing signals;
second signal providing means coupled to the pivot and providing signals corresponding to the tilt of the gyroscope means and signals corresponding to the motion of the ground based equipment when the gyroscope means is in the gyrocompassing mode;
the control means including means connected to the gyroscope means and to the first and second signal providing means and responsive to the signals therefrom for compensating for predetermined gyroscope means tilt and ground based equipment base motion parameters, and including means for controlling the means for rotatably driving the pivot and means for controlling the pivot locking and unlocking means; and
the gyroscope means including a ring laser gyro for providing frequency modulated analog signals corresponding to earth's rate, means connected to the ring laser gyro for processing the frequency modulated analog signals therefrom and for providing corresponding digital gyrocompassing signals, and the control means including means responsive to the digital gyrocompassing signals for providing north reference signals.

12. A north finding system as described by claim 11, including:
the ring laser gyro providing laser beam intensity signals and dither instantaneous amplitude signals;
the compensating means included in the control means providing first and second ring laser gyro parameter compensating signals;
pathlength control means connected to the ring laser gyro and to the control means and responsive to the laser beam intensity signals and the first ring laser gyro parameter compensating signal for controlling the ring laser gyro pathlength; and
dither control means connected to the ring laser gyro and the control means and responsive to the dither instantaneous amplitude signals and the second ring laser gyro parameter compensating signal for controlling ring laser gyro dither.

13. A north finding system as described by claim 11, including:
   a high voltage power supply; and
   a current regulator connected to the ring laser gyro and to the high voltage power supply for powering the ring laser gyro.

14. A north finding system of the type mounted to ground based equipment for providing a north reference for said equipment, and including platform means and control means, said north finding system comprising:
   the platform means including a case and a pivot rotatably supported by the case for being indexed to a plurality of positions;
   means coupled to the pivot for rotatably driving the pivot to index said pivot to the plurality of positions;
   first signal providing means coupled to the pivot for providing signals corresponding to the angular position of said pivot;
   means coupled to the pivot for locking the pivot to prevent said pivot from being rotatably driven and for thereby strapping down the platform means, and for otherwise unlocking said pivot;
   gyroscope means coupled to the pivot for sensing earth's rate when the platform means is strapped down, and thereupon being in a gyrocompassing mode and providing gyrocompassing signals;
   second signal providing means coupled to the pivot and providing signals corresponding to the tilt of the gyroscope means and signals corresponding to the motion of the ground based equipment when the gyroscope means is in the gyrocompassing mode;
   the control means including means connected to the gyroscope means and to the first and second signal providing means and responsive to the signals therefrom for compensating for predetermined gyroscope means tilt and ground based equipment base motion parameters, and including means for controlling the means for rotatably driving the pivot and means for controlling the pivot locking and unlocking means; and
   the second signals providing means including a first accelerometer mounted along a first axis of the platform means and providing a first output, a second accelerometer mounted along a second axis of the platform means and providing a second output, said first and second axes being orthogonal and defining a plate which is tangential to the earth's surface when the platform means is level, means for multiplexing the first and second outputs for providing an analog multiplexed output, means for converting the analog multiplexed output to a digital output, and the compensating means including in the control means connected to the first and second accelerometers and responsive to the first and second outputs therefrom for compensating for gyroscope means tilt and ground based equipment base motion parameters.

* * * * *